United States Patent [19]

Briggette, Sr. et al.

[11] Patent Number: 5,168,196
[45] Date of Patent: Dec. 1, 1992

[54] COMBINATION WINDSHIELD WIPER/HEADLIGHT SWITCH

[76] Inventors: Peter J. Briggette, Sr., P.O. Box 375, Citra, Fla. 32113; Peter J. Briggette, Jr., 75 SE. 16th Ave. #A-101, Gainesville, Fla. 32601

[21] Appl. No.: 751,505

[22] Filed: Aug. 29, 1991

[51] Int. Cl.⁵ .......................... B60Q 1/02; H02G 3/00
[52] U.S. Cl. ........................................ 315/82; 315/77; 307/10.8
[58] Field of Search .................. 315/82, 77; 307/10.1, 307/10.8; 200/61.54

[56] References Cited

U.S. PATENT DOCUMENTS

| | | | |
|---|---|---|---|
| 3,591,845 | 7/1971 | Vanderpoel, Jr. | 315/82 |
| 3,600,596 | 8/1971 | Aloisantoni | 315/82 X |
| 3,824,405 | 7/1974 | Glaze | 307/10 LS |
| 4,058,793 | 11/1977 | Copeland | 315/82 X |
| 4,337,400 | 6/1982 | Hahn | 307/10 LS |
| 4,667,067 | 5/1987 | Lane, Jr. | 200/61.54 |
| 4,723,057 | 2/1988 | Lane, Jr. | 200/61.54 X |
| 4,968,895 | 11/1990 | Leclercq | 307/10.8 |
| 5,051,873 | 9/1991 | Ruter | 315/82 X |
| 5,055,823 | 10/1991 | Fuller | 307/10.1 |

*Primary Examiner*—Eugene R. LaRoche
*Assistant Examiner*—Son Dinh
*Attorney, Agent, or Firm*—Dominik, Stein, Saccocio, Reese, Colitz, & Van Der Wall

[57] ABSTRACT

An apparatus for simultaneously activating the lights and windshield wipers of an automobile comprising a housing formed as a half cylinder with a curved inside surface; securing means to hold the housing on the turn signal of an automobile; a multi-position thumb switch located on the outside surface of the housing; wires coupled to the switch, one wire coupled to a source of electrical potential and the other wire coupled to a windshield wiper motor and the head and tail lights; and means to sense darkness and retain the head and tail lights energized when turning off the switch in the dark.

8 Claims, 2 Drawing Sheets

COMBINATION WINDSHIELD WIPER/HEADLIGHT SWITCH

BACKGROUND OF THE INVENTION

1. Field of the Invention

The present invention relates to a combination windshield wiper/headlight switch and, more particularly, to a multi-positional thumb switch positionable upon the turn signal post of an automobile, which simultaneously activates the headlights and taillights when turning on the windshield wipers of an automobile, the switching device being such that it may be easily incorporated into pre-existing automobiles, the switching device also being such that if the windshield wipers, headlights and taillights are activated through the thumb switch during daylight, and the driver then encounters night time conditions, a voice will alert him that the head and tail lights should be activated through their normal mode of operation.

2. Description of the Background Art

Throughout the United States, steps are being taken to improve upon automobile safety, both in the production phase and in the regulation of highway traffic. In reference to the regulation of highway traffic, it is noted that many states now require that when drivers operate windshield wipers they must also simultaneously turn on headlights and tail lights. This requirement greatly improves the ability of a driver to see and be seen during rainy or otherwise low visibility conditions.

The present invention, the combination windshield wiper/headlight switch, lends itself to the simultaneous operation of windshield wipers, headlights and tail lights. Thus, the present invention will insure that if a driver is operating his or her windshield wipers, he or she will also be operating the head and tail lights. Furthermore, the current invention overcomes the problem encountered when people drive in the rain during daylight hours and then subsequently park their automobiles, forgetting to turn off their headlights. One of the largest reasons automobile batteries go dead is owner negligence in turning off the headlights. As a result, the current invention will not only markedly increase highway safety, it will help drivers avoid one of their biggest inconveniences.

A further safety feature of the present invention is a voice alarm which will be activated if the switch is used to activate the windshield wipers, headlights and tail lights during daylight hours and then it subsequently becomes dark. The voice alarm will notify the driver that darkness has arrived and that they should activate the headlights through their normal mode of operation. This feature assures that a driver will not inadvertently turn off the head or tail lights upon turning off the windshield wipers.

Many times the latest safety feature for automobiles is only installed into new automobiles, thus making the new safety feature useless for people who already own a automobile and do not wish to purchase a new one. However, this is not the case in the present invention as it may be retro-fitted into any existing automobile. Conversely, it is also such that it may be incorporated into any mass production type setting.

The need for a safety feature of the present type is evidenced by the large number of commercial devices and patents addressing this problem. Consider the large number of U.S. Patents that are representative of known combination windshield wiper/head light switches, as for example U.S. Pat. Nos. 3,500,119 to Price; 3,519,837 to Nolan; 3,591,845 to Vanderpoel; 3,600,596 to Aloisantoni; 3,824,405 to Glaze; 4,900,946 to Williams; 4,956,562 to Benedict; and 4,985,660 to Cronk.

The patent to Williams discloses a multi-function turn signal switch for automotive vehicles. The switch, however, is for controlling many automobile functions not merely the windshield wipers and headlights. Furthermore, the installation of the turn signal switch would be complex in nature, and not simplified for retro-fit situations as in the present invention.

The patents to Nolin, Price, Vanderpoel, Aloisantoni, Glaze and Cronk all disclose circuitry which is used to switch on automobile lights once the windshield wipers are turned on. None of these patents, however, disclose the novelty of a multi-position switch attachable to a turn signal post. Furthermore, none of the above mentioned patents discloses a warning system to ensure that during night conditions the lights are not inadvertently turned off with the windshield wipers.

The patent to Benedict discloses circuitry to activate the lights of an automobile once the windshields wipers have been turned on. Furthermore, the patent to Benedict discloses a method to keep the lights of an automobile on once the windshield wipers have been turned off. This patent, however, fails to disclose the novelty of a multi-position switch which is readily attachable to the turn signal post of an automobile. Additionally this patent does not disclose the novelty of a voice alarm to ensure that during night conditions the lights are not inadvertently turned off with the windshield wipers.

Therefore, it is an object of the present invention to provide an apparatus for simultaneously activating the lights and windshield wipers of an automobile comprising a housing formed as a half cylinder with a curved inside surface; securing means to hold the housing on the turn signal of an automobile; a multi-position thumb switch located on the outside surface of the housing; wires coupled to the switch, one wire coupled to a source of electrical potential and the other wire coupled to a windshield wiper motor and the head and tail lights; and means to sense darkness and retain the head and tail lights energized when turning off the switch in the dark.

It is a further object of the invention to improve the safety of automobiles.

It is a further object of the invention to insure that windshield wipers of automobiles may only be operated with the headlights on.

It is a further object of the invention to retro-fit existing automobiles with a multi-position thumb switch on the turn signal which precludes windshield wiper operation with the headlights off.

It is a further object of the invention to preclude turning off the headlights and taillights of an operating automobile during darkness while turning off the windshield wipers.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

For the purpose of summarizing this invention, this invention may be incorporated into an apparatus for simultaneously activating an automobiles lights and windshield wipers comprising a cylindrical casing formed of housing halves of sufficient inside diameter to fit on a turn signal post of an automobile; a hinge located along adjacent outside edges of the housing halves; a locking means located adjacent other outside edges of the housing halves opposite the hinge; a multi-position switch located on the outside surface of the one housing half between the hinge and the locking means; a plurality of wires coupled to the multi-position switch, one wire leading to a source of potential, and another wire leading to the windshield wiper motor and the headlights; a light sensor positioned in one housing half adjacent to its exterior surface; a voice alarm which activates if the light sensor indicates darkness and the thumb switch is in use.

The invention may also be incorporated into an apparatus for simultaneously activating the lights and windshield wipers of an automobile comprising a housing formed as a half cylinder with a curved inside surface; securing means to hold the housing on the turn signal of an automobile; a multi-position thumb switch located on the outside surface of the housing; wires coupled to the switch, one wire coupled to a source of electrical potential and the other wire coupled to a windshield wiper motor and the head and tail lights; and means to sense darkness and retain the head and tail lights energized when turning off the switch in the dark.

The apparatus further includes means to generate a voice signal when turning off the switch in the dark. The switch is selectively movable by an operator between an inoperative open position and an operative closed position coupling the battery to the wiper motor and the head and tail lights and a light sensor all in electrical parallel. The apparatus further includes a voice alarm following the light sensor in electrical series therewith. The apparatus further includes electrical means coupling the wiper motor and the head and tail lights with a further mechanism for activation.

The foregoing has outlined rather broadly the more pertinent and more important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

DETAILED DESCRIPTION OF THE DRAWINGS

Similar reference characters refer to similar parts throughout the several views of the drawings.

DETAILED DESCRIPTION OF THE PREFERRED EMBODIMENT

Figure 1:
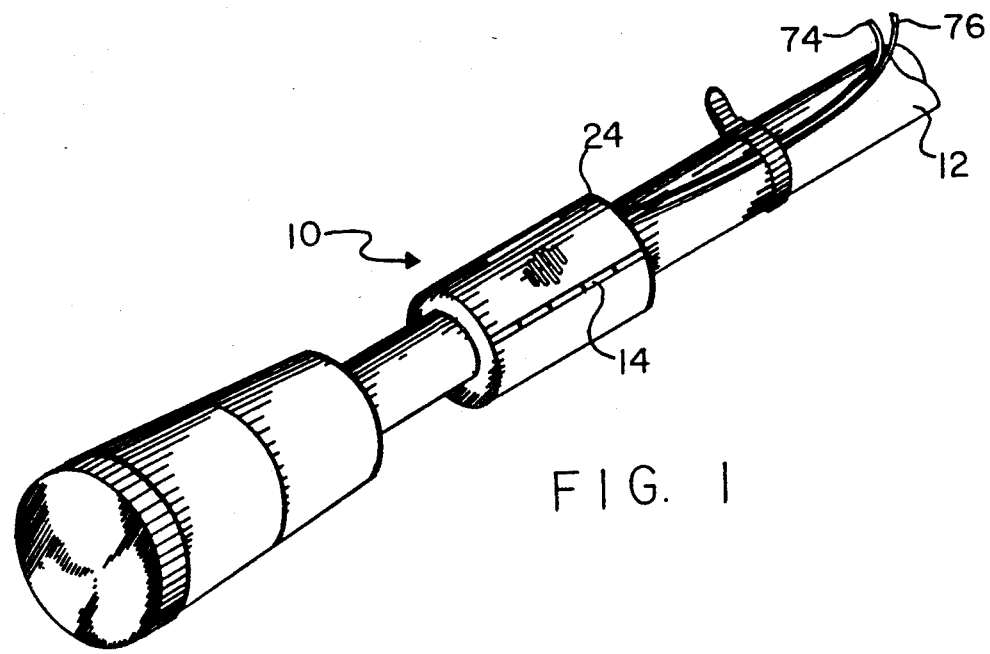
FIG. 1 is a perspective illustration of the cylindrical casing with the functioning components of the present invention operatively positioned upon the turn signal post of an automobile.
Figure 2:
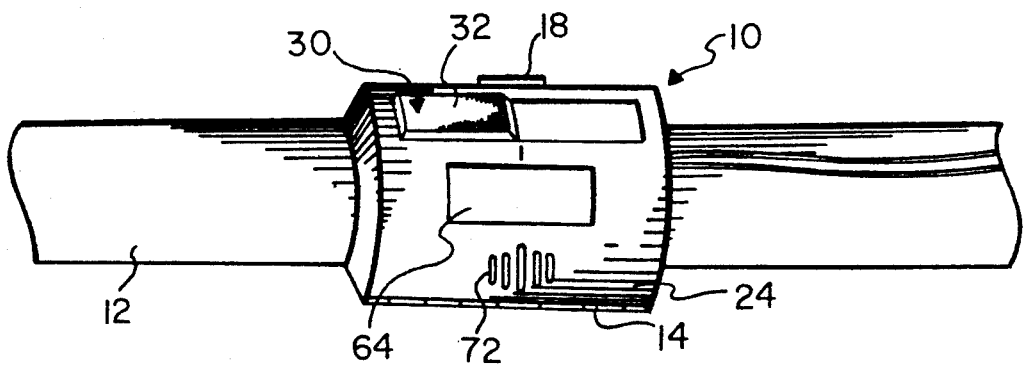
FIG. 2 is an enlarged elevational view of the casing shown in FIG. 1.
Figure 3:
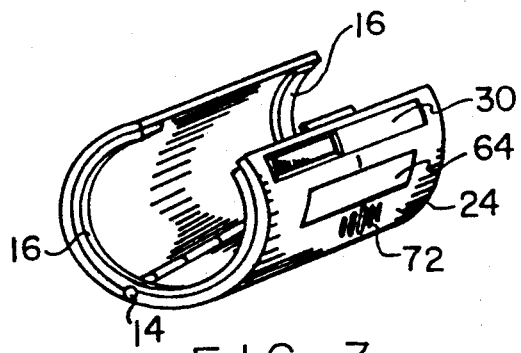
FIG. 3 is a perspective illustration of the cylindrical casing of FIGS. 2 and 3 in the opened configuration wherein it is removed from the turn signal post.
Figure 4:
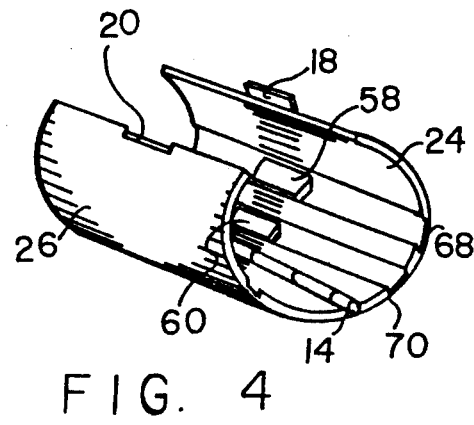
FIG. 4 is a perspective view similar to FIG. 3 but taken from the opposite side.

The preferred embodiment of the invention has as its principle component a cylindrical casing 10. The cylindrical casing has sufficient inside diameter such that it may be placed over an existing turn signal post 12. The cylindrical casing is hinged along an axial extent at adjacent edges to form cooperable casing halves. The hinge 14 functions to enable the casing to be readily separated and removably placed over an existing turn signal post 12. Semicircular members 16, of a resilient foam material are glued or otherwise secured to the ends of the casing halves to allow fitting over posts 12 of varying sizes or shapes. They also allow room for the placement of electrical wires thereadjacent. The opposite edges of the cylindrical casing, the edges opposite the hinge, have a locking mechanism 18 and 20. The locking mechanism functions to secure the casing in place once it is positioned on a turn signal post.

In the preferred embodiment the casing 10 is placed upon the turn signal post such that the hinge 14 is facing toward the rear of the automobile, towards the driver, and the locking mechanism is facing- forwardly towards the front of the automobile in which it is located. The casing thus has an upper half 24 which functions as a housing and a lower half 26 which functions as a securement mechanism for the housing.

Upon the outside surface of the casing between the hinge and the locking mechanism, facing towards the roof of the automobile, is a multi-position thumb switch 30. In the preferred embodiment there are two switch positions. The first position corresponding to the "off" position wherein neither the headlights, tail lights or the windshield wipers are in operation through the switch. Note FIG. 6. The second position of the thumb switch, not shown, activates the windshield wipers to the low speed and the head and tail lights to their normal brightness. It does not operate the high beams. This is effected when the sliding part 32 of the switch 30 moves its electrically conductive contact 34 and associated wire into physical contact with the fixed part 38 of the switch and its electrically conductive contact 40 and its associated wire. The wires couple the battery 44 with the motors 46 and 48 for the wipers and the lights. The headlights, taillights and windshield wipers are thus operable jointly from the single thumb switch. Additionally, the use of the thumb switch does not interfere with the normal use of the windshield wiper or headlights bright setting of the headlights which are additionally controlled through lines 52 and 54 in the normal fashion.

In the preferred embodiment, two electrical components, preferably microchips 58 and 60, are additionally provided. These are to ensure that if the thumb switch is activated during daylight hours and then it becomes dark, a voice alarm will alert the driver to turn on the headlights through their normal mode of operation.

The first electrical component 58 is a light sensor to indicate whether or not the automobile is being driven in dark conditions. The light sensor is located on the middle portion of the housing. Due to the nature of the sensor it should not be located on the lower part of the casing. Therefore, an aperture 64 through the housing 24 is provided in which to place the light sensor.

The second electrical component 60 indicates whether or not the multi-position thumb switch is in use. This component is a voice member positionable anywhere within the casing, but preferably between the multi-position thumb switch and the light sensor. The alarm that these two sensor activate is the voice alarm. The voice alarm comprises a microchip with small speaker. The microchip is positioned closely with respect to the speaker or preferably integral therein. The speaker is located near the surface of the casing between the hinge and the light sensor. Narrow channels or recesses 68 and 70 are made in the interior surface of the casing to enable the housing for the press fitting of the sensors therein. In addition, slots are formed in the casing above the voice alarm for greater clarity of the voice message created by such alarm.

Figure 6:
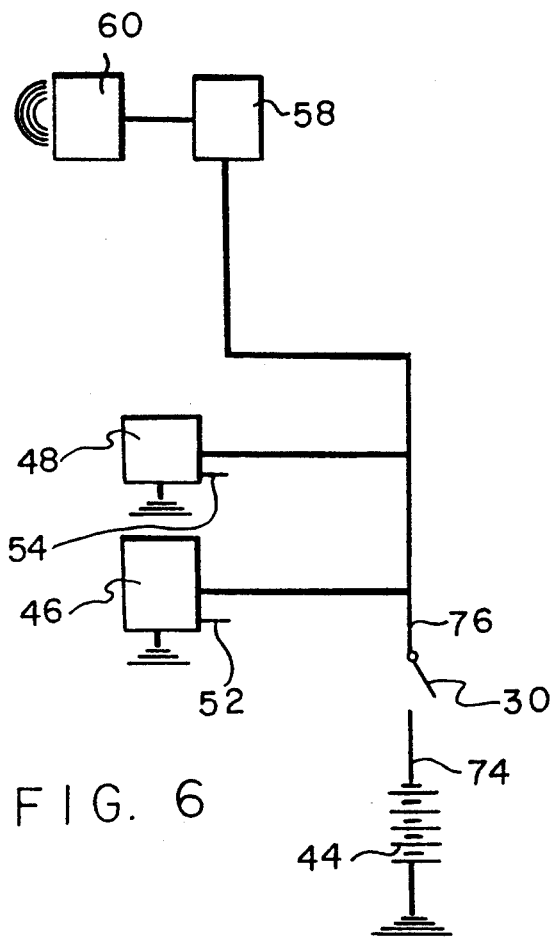
FIG. 6 is an electrical diagram of the relationship between the multi-positional switch, windshield wiper, head/tail lights, light monitor, and voice alarm.
Figure 5:
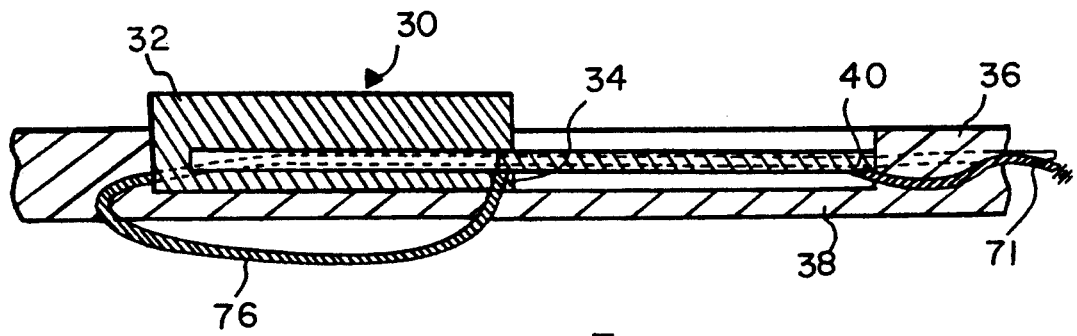
FIG. 5 is a sectional view of the switch of the prior Figures.

A circuit diagram is shown in FIG. 6 to illustrate the relation of the thumb switch, headlight/taillight motor, windshield wiper motor, light sensor and voice component. As indicated in this Figure, two wires 74 and 76 are connected directly to the thumb switch. The first wire 74 is connected to a source of potential, in most instances a 12 V automobile battery. The second wire 76 is connected to the windshield wiper motor. Additional wires are connected in the circuitry to the various components of the system in the conventional manner. As can readily be seen in the circuit diagram, if thumb switch is activating the windshield wipers and headlights and the light sensor registers a dark condition, then the voice alarm is activated to generate a voice signal, which would say "Please turn on your headlights" or the like to inform the driver to turn on the lights normally.

In an alternate embodiment of the invention, the cylindrical casing includes only one housing half, similar to that of the first embodiment, and there is no hinge or locking mechanism. Rather, strap means or the like are attached to the upper and lower portions of the half cylinder or housing. The housing is attached to the turn signal post through the use of velcro straps or the like.

In one mode of operation, a time delay switch is included in the switch 30. In this manner, the opening of switch 30 inactivates the windshield wipers and the head and tail lights but only after a time delay of about 10 to 15 seconds. Such time delay switches are conventional in the art. This provides time to light the lights by the standard switch. In an alternate mode of operation, the voice signal may be eliminated but in such circumstances, the car would have to be equipped with an automatic light sensor which turns the head and tail lights on and off with darkness and daylight. Such mechanisms are also conventional.

The present disclosure includes that contained in the appended claims, as well as that of the foregoing description. Although this invention has been described in its preferred form with a certain degree of particularity, it is understood that the present disclosure of the preferred form has been made only be way of example and that numerous changes in the details of construction and the combination and arrangement of parts may be resorted to without departing from the spirit of the invention.

Now that the invention has been described,
What is claimed is:

1. An apparatus for simultaneously activating an automobiles lights and windshield wipers comprising:
   a cylindrical casing formed of housing halves of sufficient inside diameter to fit on a turn signal post of an automobile;
   a hinge located along adjacent outside edges of the housing halves;
   a locking means located adjacent other outside edges of the housing halves opposite the hinge;
   a multi-position switch located on the outside surface of the one housing half between the hinge and the locking means;
   a plurality of wires coupled to the multi-position switch, one wire leading to a source of potential, and another wire leading to the windshield wiper motor and the headlights;
   a light sensor positioned in one housing half adjacent to its exterior surface;
   a voice alarm which activates if the light sensor indicates darkness and the multi-position switch is in use.

2. For use with an automobile having head lights, tail lights, turn signals and windshield wipers, an apparatus for simultaneously activating the lights and windshield wipers of an automobile comprising:
   a housing formed as a half cylinder with a curved inside surface;
   securing means to hold the housing on the turn signal of an automobile;
   a multi-position thumb switch located on the outside surface of the housing;
   wires coupled to the switch, one wire coupled to a source of electrical potential and the other wire coupled to a windshield wiper motor and the head and tail lights; and
   means to sense darkness and means to alert the driver if the light sensor indicates darkness and multi-position thumb switch in use.

3. The apparatus as set forth in claim 2 wherein means to alert the driver is a voice alarm.

4. The apparatus as set forth in claim 3 wherein the switch is selectively movable by an operator between an inoperative open position and an operative closed position coupling the battery to the wiper motor and the head and tail lights and a light sensor all in electrical parallel.

5. The apparatus as set forth in claim 4 and further including a voice alarm following the light sensor in electrical series therewith.

6. The apparatus as set forth in claim 5 and further including electrical means coupling the wiper motor and the head and tail lights with a further mechanism for activation.

7. For use in an automobile having lights and windshield wipers, an apparatus for simultaneously activating the lights and windshield wipers of an automobile comprising:
   a housing positionable in an automobile for being utilized by a driver;

a multi-position switch located on the outside surface of the housing movable between an activated closed position and an inactivated open position;

a plurality of wires coupled to the multi-position switch, one wire leading to a source of potential, and another wire leading to the windshield wiper motor and the headlights;

a light sensor positioned in the housing adjacent to its exterior surface to determine when it is dark and the switch is in the activated closed position;

an alarm coupled to the light sensor and switch adapted to be energized to alert the driver if the light sensor indicates darkness and the multi-position switch is in the activated closed position.

8. The apparatus as set forth in claim 7 wherein the alarm is positioned in the housing.

* * * * *